June 5, 1956     W. H. GOSS ET AL     2,748,703
ROCKET TYPE LAUNCHING CARRIAGE FOR ORDNANCE MISSILE
Filed April 27, 1948     3 Sheets-Sheet 1

*INVENTORS:*
WILBUR H. GOSS
DAVID A. WASHBURN
BY

ATTORNEY

June 5, 1956  W. H. GOSS ET AL  2,748,703
ROCKET TYPE LAUNCHING CARRIAGE FOR ORDNANCE MISSILE
Filed April 27, 1948  3 Sheets-Sheet 2
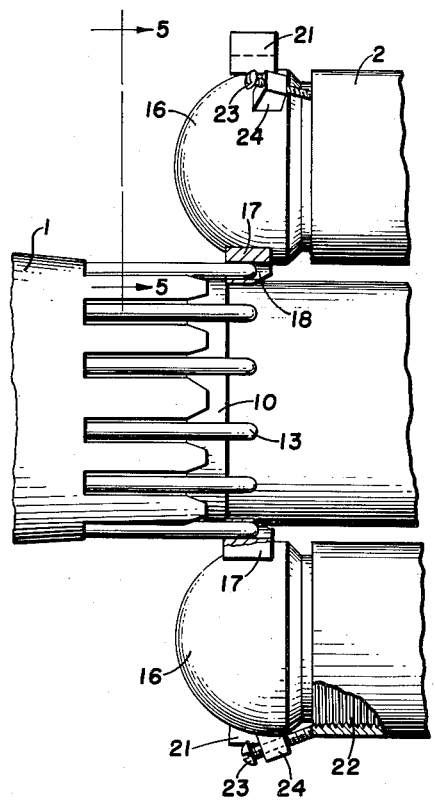
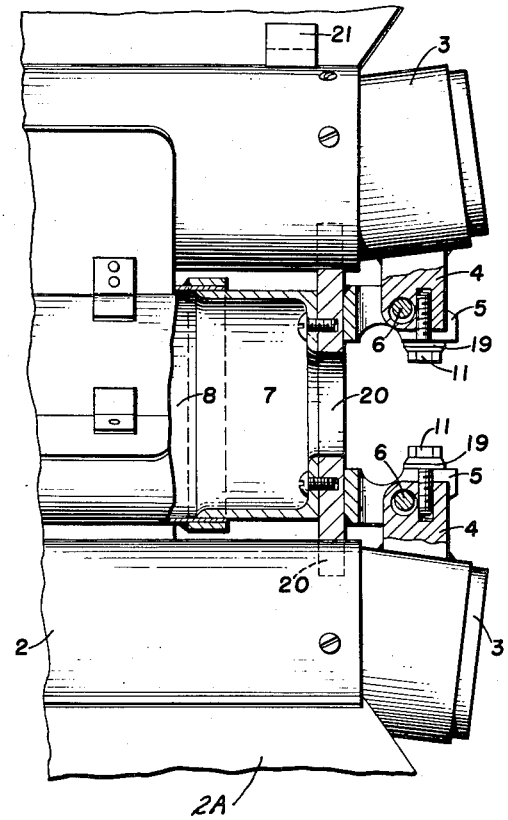
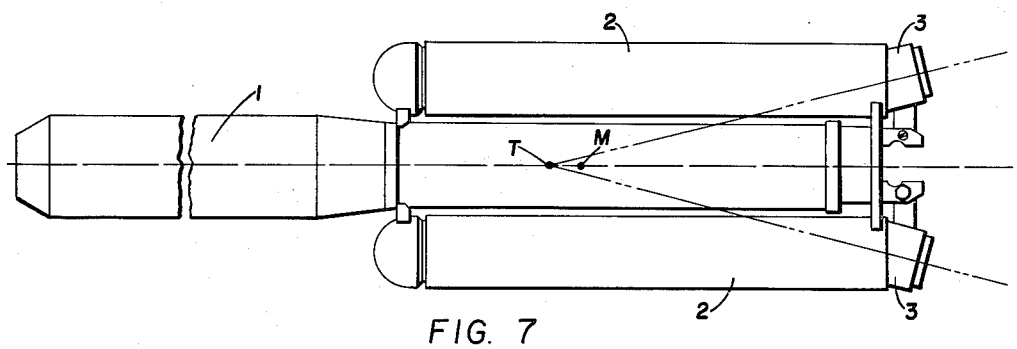
INVENTORS:
WILBUR H. GOSS
DAVID A. WASHBURN
BY
ATTORNEY June 5, 1956 W. H. GOSS ET AL 2,748,703
ROCKET TYPE LAUNCHING CARRIAGE FOR ORDNANCE MISSILE
Filed April 27, 1948 3 Sheets-Sheet 3
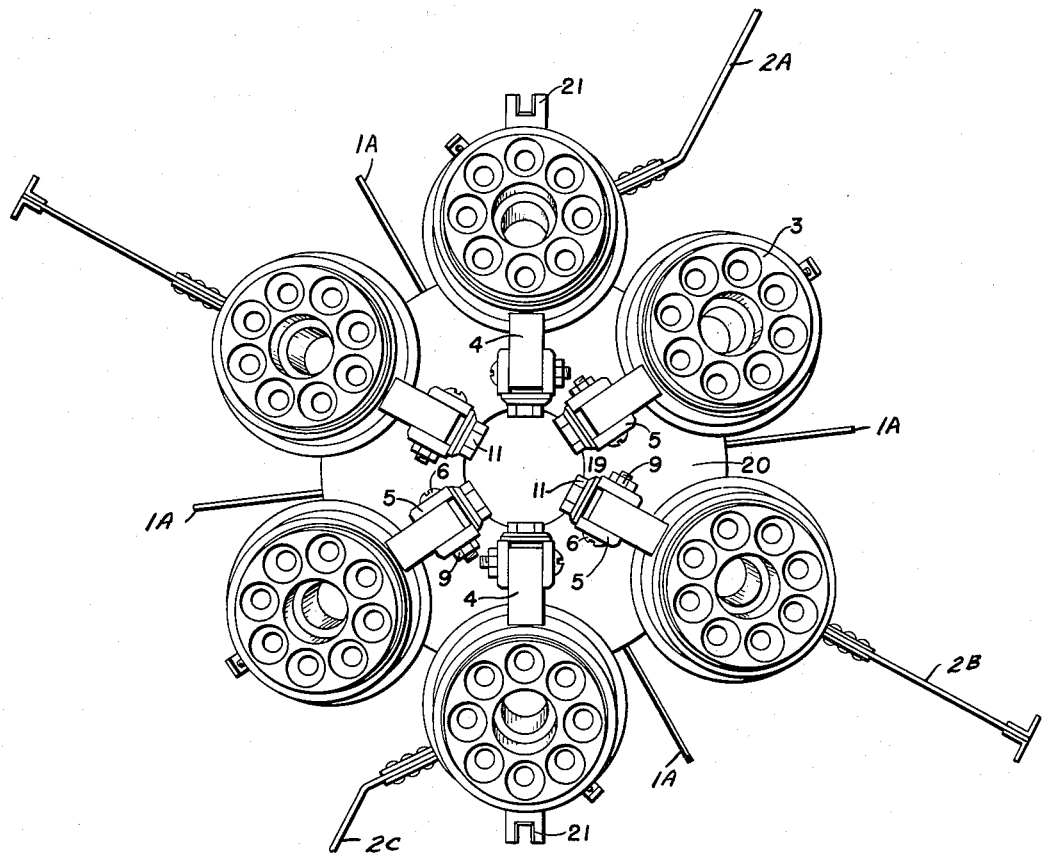
FIG. 4
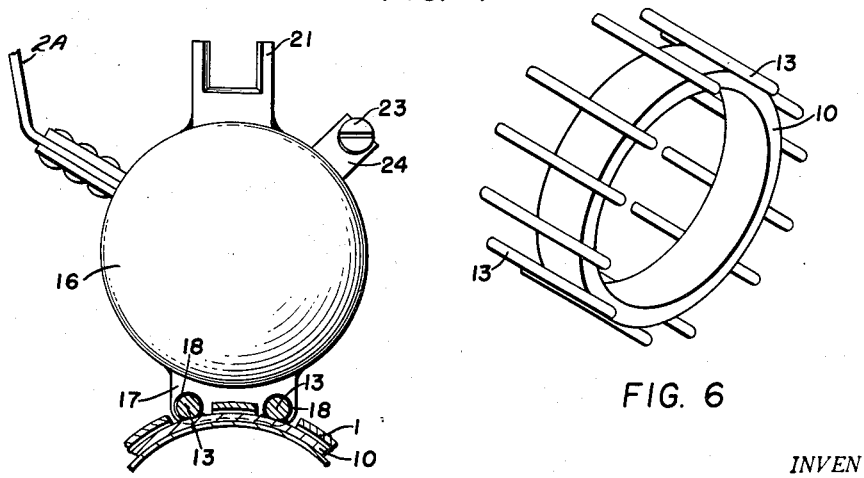
FIG. 5
FIG. 6
INVENTORS:
WILBUR H. GOSS
DAVID A. WASHBURN
BY
*J. D. O'Brien*
ATTORNEY

United States Patent Office 2,748,703
Patented June 5, 1956

2,748,703

ROCKET TYPE LAUNCHING CARRIAGE FOR ORDNANCE MISSILE

Wilbur H. Goss and David A. Washburn, Silver Spring, Md., assignors to the United States of America as represented by the Secretary of the Navy Application April 27, 1948, Serial No. 23,477

10 Claims. (Cl. 102—49)

The present invention relates to rocket-type launching carriages for ordnance missiles, such as ram jets.

More particularly, it relates to a carriage that ensures launching of the missile without damage thereto, and is so designed that it does not limit the dimensions of the fins on the missile.

The present invention consists in providing means for attaching rockets to the missile in such way that they will drop off automatically when their thrust is spent, so that the missile then can proceed under its own power, unencumbered by these starting devices.

An object of the invention is to provide connections between the rockets and the missile, so arranged that normally the rockets are supported with their axes parallel to the axis of the missile, thus decreasing the aerodynamic drag. However, the axes of the rocket reactions are made concurrent, at substantially the center of mass of the entire assemblage.

Another object is to provide a launching carriage wherein the rockets are not interconnected by pressure-equalizing conduits, and which hence does not interfere with the extents of any fins on the missile, between said rockets.

An important object is to provide means whereby the rocket thrust is exerted, not on the relatively weak rear end of the tail pipe, but on a special thrust member secured to the missile at a location much farther forward.

Still another object is to provide means whereby the individual rockets may be drawn up tight against their common rear support so that they will not vibrate or chatter during operation.

A further object is to provide hinges on a supporting ring, for connecting the launching rockets to the missile, said hinges having very loose fits, and being of such structures that, when the thrust of any rocket fails or ceases, said rocket will move slightly toward the tail end of the missile, and when all said rockets have become spent, their forward ends will become unlatched from the missile, and thereupon will swing outwardly in radial planes, out of parallelism with the missile axis, and as a result their drag will be increased automatically so that the launching parts will be left behind, while the missile proceeds on its way.

Still another object is to provide a booster rocket carriage having a semi-rigid structure having lost motion, which prevents binding and other extreme stress concentrations.

Stated very generally, the shifting and releasing of the rockets involves the several steps of allowing each rocket to fall behind the missile to a limited extent as permitted by the play or "lost-motion" of the hinges, when its rocket thrust fails or ceases; allowing all the rockets to pivot outward about their said hinges at the tail end of the missile when all are exhausted; and thereupon, by a further movement, disengaging the ring and the rockets hinged thereto completely from the missile, so that the entire launching device will then drop off.

Other objects and advantages of the invention will be specifically pointed out herein, while still further ones will become evident from the structures and procedures disclosed.

The invention will be understood from the present description of one embodiment thereof, at present preferred, and the accompanying drawing illustrating the same, wherein:

Fig. 2 is a similar fragmentary view, on a larger scale, partly in axial section, showing the head ends of the rockets and the adjacent portion of the ram jet;

Fig. 3 is a corresponding fragmentary, partly sectional view showing the rear end portions of the rockets and the associated portion of the ram jet and the hinges carried thereby;

Fig. 4 is a rear end elevation of the ram jet with its launching carriage, all the rockets being shown;

Fig. 5 is a front end elevation of one of the rockets, a fragment of the adjacent ram jet being shown in section, on the plane 5—5 of Fig. 2;

Fig. 6 is a perspective view of a pin-ring forming part of the means for receiving the rocket thrust and for holding the heads of the rockets in place; and Fig. 7 is a side elevation, on a reduced scale, of the ram jet and its launching carriage, certain of the rockets being omitted, and an intermediate portion of the forward end of the ram jet being broken away.

Figure 1:
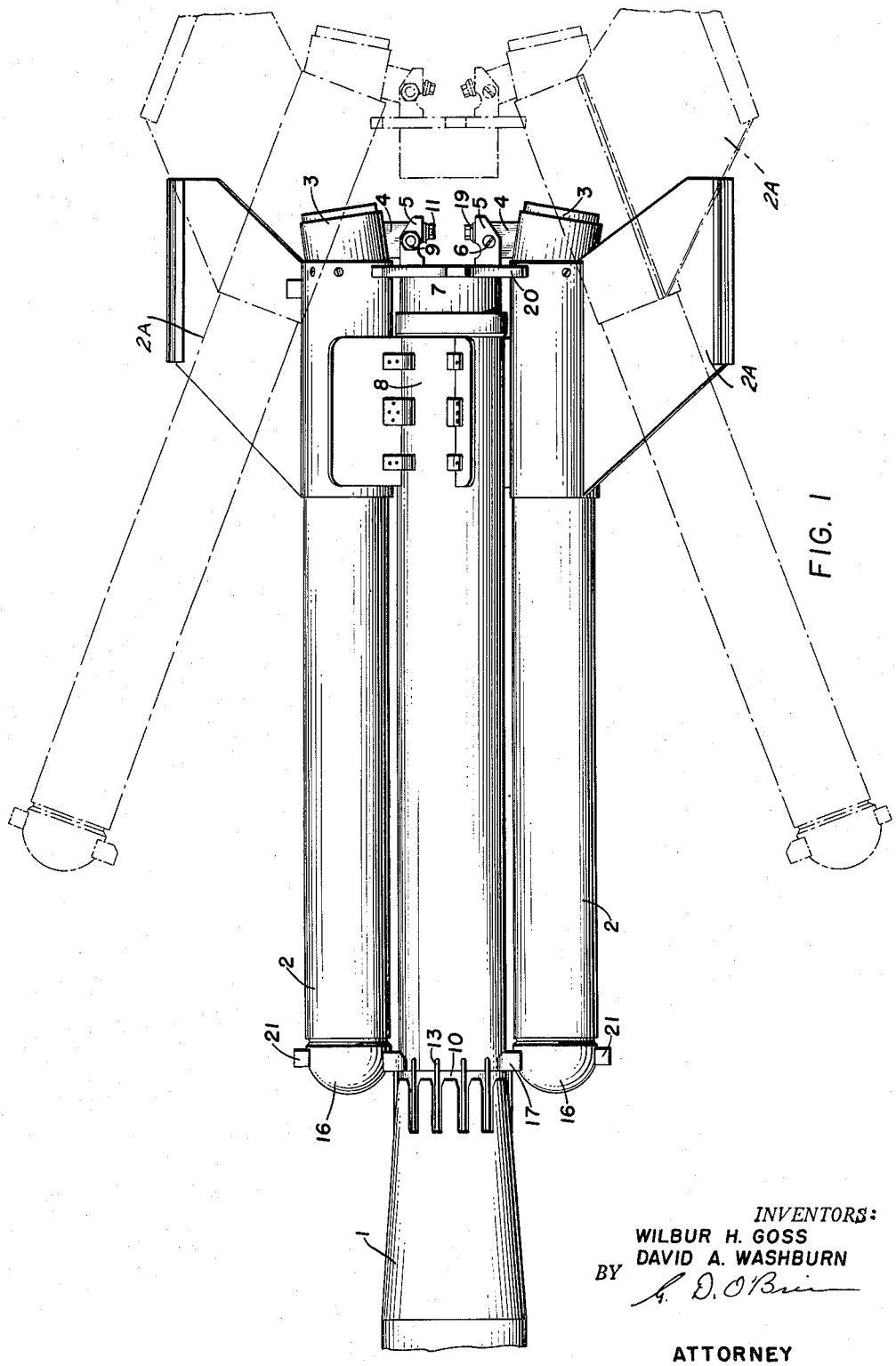
Fig. 1 is a side elevation, partly broken away, and showing only two of the rockets.

A type of launcher heretofore used consisted of a number of rockets assembled in the form of a cage which could be slid over the tail pipe of the missile, and was capable of imparting its thrust directly against the end of such pipe. The heads of the rockets were connected by manifolds to equalize the gas pressures, and the connecting means o fcourse had to slip over the missile fins, thus limiting the extents of the latter.

Aside from the restriction thus placed on the size of the fins, it was found to be undesirable to exert the thrust directly on the relatively weak tail pipe, because the powerful thrusts developed by the rockets often crumpled or otherwise deformed such tail pipe, which always resulted in defective operation of the ram jet or athodyd, and often also caused the latter to become jammed in the launching carriage, so that the carriage could not drop off when the rockets were spent.

The present invention eliminates both these defects, by causing the thrust of the rockets to be applied, not directly to the rear end of the tail pipe, but to a strong ring, rigidly secured to the outside of the ram jet at a location forward of the rocket bodies. Moreover, the rockets are so supported that when spent they readily become disengaged from said ring and swing outward, away from the ram jet, and thereupon are moved backward by air-resistance and caused to drop off the ram jet completely, all as is disclosed in detail hereinafter.

Referring to Figs. 1, 2 and 3, there is shown a missile 1, for example, a ram jet. This missile has a number of rockets 2 held thereto releasably, to provide starting thrust. The missile has a series of fins 1A located about its periphery near the end of its outlet tailpipe 8 for guidance of the missile after the rockets 2 have separated therefrom. Another series of guide fins 2A, 2B and 2C are located around the periphery of the rockets 2. Each rocket 2 has its rear fitting 3 inclined at a slight angle to the general direction of the rocket axis. In this rear fitting are the nozzles of the rocket, through which its combustion products escape, an arbitrary number, usually about six or eight, of such nozzles being provided in each rocket.

A ring 7, which slips easily into the rear end of the ram jet outlet pipe 8, carries a number of pairs of perforated hinge plates 5, corresponding to the number of rockets to be used, and each rear fitting 3 has a perforated lug 4 rigidly secured to a corresponding rocket, and held pivotally between the corresponding plates 5 by a suitable screw or bolt constituting a hinge pin 6, which in turn may be kept in place by a nut 9 or the like. A cap screw 11, threaded into each lug 4, bears against the plates 5, a suitable washer 19 being interposed. Tightening the screws 11 will draw up the rockets against plate 20, on which the hinge plates 5 are mounted. This plate 20 has arcuate notches therein to conform to the shape of the rocket bodies, as shown in Fig. 4.

It will be seen that although each rocket 2 has its axis parallel to the axis of the ram jet 1, the axes of the rear fittings 3 are inclined so as to be concurrent at a point T chosen to be slightly forward of the center of mass M of the charged rockets and missile, jointly, as indicated in Fig. 7.

Certain of the rocket heads 16 may have grooved guide lugs 21 thereon to guide the missile in or on the launching rails.

A ring 10, shown in detail in Fig. 6, and in assembled relation with the ram jet in Figs. 1 and 2, is provided to receive the rocket thrust. This ring, which is secured firmly to the ram jet body 1 in any suitable way, as by welding, for example, has a series of pins or rods 13 secured thereto, and extending parallel to the axis of the ram jet 1. In the present case, where it is assumed that six rockets are provided, this thrust ring 10 will carry twelve rods, two for each rocket. Fig. 5 shows how one pair of said rods 13 coacts with a corresponding rocket-head lug 17, by entering the holes 18 therein.

These rods merely position the lugs 17 correctly, and keep the rocket heads from moving outward, and preferably do not transmit any of the rocket thrust to the missile. This function is accomplished best by direct contact of the lugs 17 with the thrust ring 10.

Coarse adjustment is provided by the threads 22 that hold the rocket caps 16 to the bodies of the rockets, and this adjustment may be held by tightening the set screw 23, threaded through lug 24, against the end of the rocket body. It will be noted that this provides only definite steps of adjustment, due to the fact that only complete turns of the cap must be made, in order that the lugs 17 and 21 may be positioned properly, as will now be described.

To offset the relative coarseness of this adjustment, all the hinge joints are made very "loose," that is, there is unusually large clearance for the hinge pins 6, so that it is possible for the rockets individually to adjust their positions to a slight extent, both forward-and-back, and radially, at the hinge-carrying plate 20. This forward-and-back adjustment, supplementing the adjustment obtainable by single turns of the rocket caps 16 on their threads, makes it possible to seat each lug 17 on the ring 10. This could not be done with the cap threads alone, because fractional turns are not available, inasmuch as the holes 18 in the lugs 17 must be alined with the rods 13, and the guide lugs 21 must also be alined properly.

The operation of the device is as follows:

Assuming that it is desired to launch a ram jet missile such as 1, having the thrust ring 10 and rods 13 secured thereto, the launching carriage, comprising the six rockets 2 hinged to the ring 20 and thus secured to the slidable ring 7, is applied to said missile by moving the rockets into place so that they lie parallel to the ram jet, and so that the ends of the rods 13 will enter the bores 18 in the lugs 17 on the respective rocket caps 16.

To assure proper adjustment, the caps are turned to bring the lugs forward or backward, as needed, to make it possible for all the lugs 17 to touch ring 10. It will be understood that it is sufficient, and is preferred, that the lugs bear against the thrust ring 10, and not against the rods. To prevent the rods from carrying any of the thrust, the bores 18 preferably extend entirely through the lugs 17, as illustrated.

The radial clearance or "lost-motion" at the hinge-carrying plate 20 makes it possible to draw up the rear ends of the rockets tightly against said plate 20, thus avoiding any chattering or vibration due to looseness.

As already stated, the nozzles of the rockets are tilted outward, so that the resulting reactions of the rockets will act substantially at, or preferably slightly forward of, the center of mass M of the entire assemblage. It will be understood that this center of mass shifts forward, as the rocket fuel is consumed.

Normally, all of the rockets will become ignited on launching and will contribute proportionate shares of thrust, the resultant lying substantially axially of the ram jet and acting at the center of thrust T, slightly forward of the center of mass. If, however, one of the rockets fails to ignite, and thus yields no thrust, the unbalance will not be serious.

When the rockets have become spent, their forward thrusts cease, and they tend to be left behind by the missile, due to the aerodynamic drag. As soon as they move back far enough to release the rods 13 from the corresponding bores 18 they will spread out by separating at their forward ends, thus increasing their exposed surface and correspondingly increasing the drag. Thereby they will rapidly become disengaged.

The rods 13 are disengaged from bores 18 simultaneously, as the ring 7 slips out of the rear end of the ram jet. The athodyd is now mechanically free of the booster assembly but still is surrounded by it; however, as the rockets open out the athodyd becomes completely free of the booster carriage.

While the invention has been disclosed with reference to the specific embodiment thereof at present preferred, it is not to be assumed that this is the only form possible. The particular launching carriage herein discussed is selected merely by way of example and not in any sense as a limitation of the invention, whose scope is defined solely in and by the following claims.

We claim:

1. A launching carriage for a missile including a casing, the carriage comprising a plurality of rockets surrounding said casing near its rear end and having their axes substantially parallel to the longitudinal axis of said missile, a base for engaging the rear end of the said casing, means attaching each rocket at its rear end to said base, said base being releasable from the casing by rearward relative motion of the base, and means releasable by relative rearward motion of the rockets with respect to said casing, for holding the forward end of each rocket to the outside of the casing, whereby the thrust of the rockets will hold the carriage in operative position until such time as the speed of the missile exceeds that of the carriage, whereupon the said carriage moves rearwardly and thus becomes disengaged from the missile casing and is left behind.

2. A launching carriage as defined in claim 1, wherein the base has a flange extending forwardly therefrom and loosely engaging in the rear end of the casing.

3. A launching carriage for a missile including a casing, the carriage comprising a plurality of rockets, a base for engaging the rear end of said casing, pivot means for attaching each rocket at its rear end to said base to allow the forward ends of said rockets to swing out, away from said casing when released therefrom, said base being releasable from the casing by rearward relative motion of the base, and means releasable by relative motion of the rockets with respect to said casing for holding the forward end of each rocket to the outside of said casing, whereby the thrust of said rockets will hold the carriage in operative position until such time as the speed of said missile exceeds that of the carriage, whereupon said carriage moves rearwardly and thus becomes disengaged from the missile casing and is left behind.

4. A launching carriage for a missile including a casing, the carriage comprising a plurality of rockets wherein certain of said rockets have fins at their rear ends, a base for engaging the rear end of the said casing, means attaching each rocket at its rear end to said base, said base being releasable from the casing by rearward relative motion of the base, and means releasable by relative rearward motion of the rockets, for holding the forward end of each rocket to the outside of the casing, whereby the thrust of the rockets will hold the carriage in operative position until such time as the speed of the missile exceeds that of the carriage, whereupon the said carriage moves rearwardly and thus becomes disengaged from the missile casing and is left behind.

5. A launching carriage for a missile including a casing having fins at its rear end, the carriage comprising a plurality of rockets wherein certain of said rockets have fins at their rear ends and wherein said fins on said casing are disposed in spaces between adjacent rockets, a base for engaging the rear end of the said casing, means attaching each rocket at its rear end to said base, said base being releasable from the casing by rearward relative motion of the base, and means releasable by relative rearward motion of the rockets, for holding the forward end of each rocket to the outside of the casing, whereby the thrust of the rocket will hold the carriage in operative position until such time as the speed of the missile exceeds that of the carriage, whereupon the said carriage moves rearwardly and thus becomes disengaged from the missile casing and is left behind.

6. A launching carriage for a missile including a casing, the carriage comprising a plurality of rockets, a base for engaging the rear end of said casing, means attaching each rocket at its rear end to said base, said base being releasable from the casing by rearward motion of said base, means releasable by relative rearward motion of said rockets for holding the forward end of each rocket to the outside of the casing, said releasable means including a thrust receiving element located adjacent the forward ends of said rockets, and each rocket having thrust imparting means releasably engaging said element.

7. A launching carriage for a missile including a casing, the carriage comprising a plurality of rockets, a base for engaging the rear end of said casing, means attaching each rocket at its rear end to said base, said base being releasable from the casing by rearward relative motion of the base, means releasable by relative rearward motion of the rockets for holding the forward end of each rocket to the outside of said casing, said means comprising a thrust receiving ring and rearwardly projecting guide elements, both said ring and said guide elements being secured to said casing, each rocket having a coacting thrust imparting element abutting against said ring, and loosely receiving the corresponding guide element, whereby said rockets are held automatically in operative position by said guide elements as long as said missile speed does not exceed that of said rockets.

8. A launching carriage for a missile including a casing, the carriage comprising a plurality of rockets, a base for engaging the rear end of said casing, means attaching each rocket at its rear end to said base including a pivot having a substantial amount of lost motion, which allows said rockets to be adjusted to fit closely about said missile casing without binding, said base being releasable from the casing by rearward relative motion of the base, and means releasable by relative rearward motion of the rockets, for holding the forward end of each rocket to the outside of the casing, whereby the thrust of the rockets will hold the carriage in operative position until such time as the speed of the missile exceeds that of the carriage, whereupon the said carriage moves rearwardly and thus becomes disengaged from the missile casing and is left behind.

9. A launching carriage for a missile including a casing, the carriage comprising a plurality of rockets, a base for engaging the rear end of said casing, means attaching each rocket at its rear end to said base including a pivot having a substantial amount of lost motion, which allows said rockets to be adjusted to fit closely about said missile casing without binding, means coacting with said pivotal attaching means to tighten the same, by taking up said lost motion, said base being releasable from the casing by rearward relative motion of the base, and means releasable by relative rearward motion of the rockets, for holding the forward end of each rocket to the outside of the casing, whereby the thrust of the rockets will hold the carriage in operative position until such time as the speed of the missile exceeds that of the carriage, whereupon the said carriage moves rearwardly and thus becomes disengaged from the missile casing and is left behind.

10. An auxiliary thrust providing arrangement for a missile including a casing, said arrangement comprising a plurality of rockets, a base for engaging the rear end of said casing and being releasable from the latter by rearward motion of said base relative to said casing, pivot means for attaching each rocket adjacent its rear end to said base to allow the forward ends of said rockets to swing out away from said casing when released from the latter, and means for holding the forward portions of said rockets to the outside of said casing and being releasable by motion of said rockets rearwardly relative to said casing, whereby the thrust of said rockets will hold said arrangement in operative position until such time as the air resistance imposed against said rockets exceeds the thrust of the latter, whereupon said rockets move rearwardly and thus become disengaged with said base from the missile casing and are left behind.

References Cited in the file of this patent
UNITED STATES PATENTS

| | | |
|---|---|---|
| 1,102,653 | Goddard | July 7, 1914 |

FOREIGN PATENTS

| | | |
|---|---|---|
| 347 | Great Britain | Jan. 26, 1878 |
| 229,444 | Switzerland | Jan. 17, 1944 |